(12) United States Patent
Chen (10) Patent No.: US 9,817,231 B2
(45) Date of Patent: Nov. 14, 2017

(54) OPTICAL SCANNING SYSTEM AND IMAGING APPARATUS FOR USING SAME

(71) Applicant: Lexmark International, Inc., Lexington, KY (US)

(72) Inventor: Fei Chen, Lexington, KY (US)

(73) Assignee: LEXMARK INTERNATIONAL, INC., Lexington, KY (US)

( * ) Notice: Subject to any disclaimer, the term of this patent is extended or adjusted under 35 U.S.C. 154(b) by 88 days.

(21) Appl. No.: 14/140,979

(22) Filed: Dec. 26, 2013

(65) Prior Publication Data

US 2015/0183232 A1 Jul. 2, 2015

(51) Int. Cl.
  *G02B 26/12* (2006.01)
  *B41J 2/45* (2006.01)
  *G03G 15/04* (2006.01)
  *B41J 2/47* (2006.01)

(52) U.S. Cl.
  CPC ............ *G02B 26/124* (2013.01); *B41J 2/451* (2013.01); *B41J 2/471* (2013.01); *G02B 26/125* (2013.01); *G03G 15/04036* (2013.01)

(58) Field of Classification Search
  None
  See application file for complete search history.

(56) References Cited

U.S. PATENT DOCUMENTS

| | | | | |
|---|---|---|---|---|
| 4,643,516 A | * | 2/1987 | Ogura | G02B 26/106 359/18 |
| 4,823,002 A | * | 4/1989 | Saito | G02B 26/126 250/235 |
| 5,051,757 A | * | 9/1991 | Hasegawa | G02B 26/125 347/250 |
| 5,153,767 A | * | 10/1992 | Makino | G02B 13/0005 359/206.1 |
| 5,179,277 A | * | 1/1993 | Tomita | G02B 26/127 250/235 |
| 5,680,242 A | * | 10/1997 | Ando | G02B 26/12 347/259 |
| 5,706,119 A | * | 1/1998 | Anzai | G02B 26/124 347/259 |

(Continued)

FOREIGN PATENT DOCUMENTS

| | | | |
|---|---|---|---|
| JP | 59077405 A | * | 5/1984 |
| JP | 04058211 A | * | 2/1992 |

(Continued)

OTHER PUBLICATIONS

Machine Translation for JP 10206778 A.*

*Primary Examiner* — Kristal Feggins
*Assistant Examiner* — Kendrick Liu (57) ABSTRACT

A scanning unit includes a light source controllable to emit a light beam; a scanning mirror having a plurality of reflective surfaces, the scanning mirror receiving the light beam from the light source and deflecting at least portions of the light beam along a scan direction; and a collimator lens disposed between the light source and the scanning mirror, the collimator lens having a light incident surface that is spherical and a light exit surface that is aspheric such that the light beam, after passing through the collimator lens, is diverged by the collimator lens so as to be incident on at least two reflective surfaces of the scanning mirror.

20 Claims, 4 Drawing Sheets

(56) References Cited

U.S. PATENT DOCUMENTS

| | | | | |
|---|---|---|---|---|
| 5,793,515 | A | * | 8/1998 | Sekikawa ............... G02B 26/12 359/216.1 |
| 2002/0131137 | A1 | * | 9/2002 | Suzuki .................... B41J 2/471 359/205.1 |
| 2006/0238848 | A1 | * | 10/2006 | Sekine ................. G02B 26/123 359/204.1 |
| 2007/0091402 | A1 | * | 4/2007 | Tomioka .................. G02B 3/04 359/201.1 |
| 2010/0226686 | A1 | * | 9/2010 | Shimomura ......... G03G 15/011 399/220 |
| 2011/0002712 | A1 | * | 1/2011 | Kudo ...................... B41J 2/471 399/200 |
| 2013/0215478 | A1 | * | 8/2013 | Mizutani ................ G02B 27/30 358/474 |

FOREIGN PATENT DOCUMENTS

| | | | | |
|---|---|---|---|---|
| JP | 06003620 | A | * | 1/1994 |
| JP | 10206778 | A | * | 8/1998 |
| JP | 11281905 | A | * | 10/1999 |

* cited by examiner

OPTICAL SCANNING SYSTEM AND IMAGING APPARATUS FOR USING SAME

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Disclosure

The present disclosure relates generally to an optical scanning system in an imaging apparatus, and particularly to an over-filled scanner (OFS) scanning system.

2. Description of the Related Art

In various imaging devices which utilize light to form images, optical scanning systems are typically incorporated to scan light beams from one or more light sources onto a target image plane surface. In an electrophotographic imaging device, for example, the image plane surface is typically a photosensitive member. Generally, light beams are swept across the image plane surface by a scanning mirror to form light spots upon the image plane surface along a scan line direction. Commonly used scanning mirrors include rotating polygon mirrors which scan light beams in one direction.

A polygon mirror can have either an under-filled or over-filled facet design. In an under-filled design, the facet length is significantly wider than the incident light beam width such that the beam footprint on a facet never crosses over the edges of the facet from start to end of a scan line operation. On the other hand, an over-filled design has a facet length that is sized such that the incident light beam completely fills a facet over the duration of a scan line operation. In this case, the width of the laser beam after it is reflected by the polygon mirror is determined by the size of the polygon facet.

Generally, in order to have a decent optical performance particularly on laser spot size, width of a light beam striking a polygon facet must be at least some requisite value, such as 4 mm. By comparison, for a given number of polygon facets, the under-filled design would require a larger polygon diameter since size of a facet would have to be wider than the requisite beam width, while the over-filled design would require a smaller polygon diameter since length of a facet only needs to be at least the same as the requisite beam width. Thus, scanning systems that employ polygon mirrors with larger number of facets can be implemented at lower costs using the overfilled design. In addition, polygon mirrors having smaller diameters are not only significantly less expensive, but also run faster, have less acoustic noise and contamination on the polygon facets.

Figure 1:
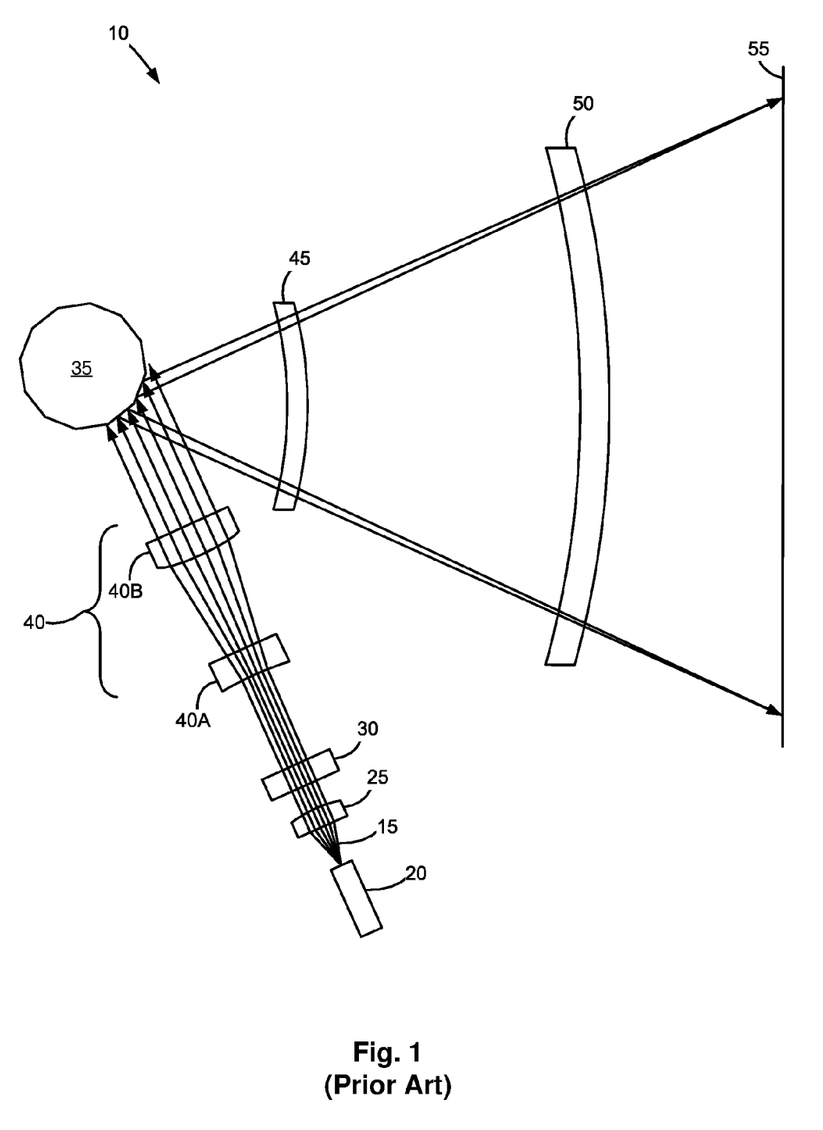
FIG. 1 illustrates a prior art optical layout of a laser scanning unit.

One of the challenges in the over-filled facet design is to achieve a sufficiently wide incoming beam with relatively small wavefront error for a good quality beam. In some existing approaches, beam expanding optic sets have been used to expand laser beams along a scan direction. As an example, FIG. 1 illustrates a schematic layout of a scanning system 10 employing the over-filled polygon facet design. Generally, light beam 15 from a light source 20 is collimated or slightly converged after passing through a collimation lens 25, and a prescan lens 30 is used to minimize pyramidal angle error of a polygon mirror 35. Additionally, a beam expanding optic set 40 including first and second lenses 40A, 40B, which are generally cylindrical lenses, are added to expand light beam 15 exiting prescan lens 30. First lens 40A typically has a concave surface along the scan direction so as to diverge light beam 15. On the other hand, second lens 40B typically has a convex surface along the scan direction to re-converge light beam 15 to a sufficient width at polygon mirror 35. Scan lenses 45, 50 are then used to focus portions of the light beam 15 scanned by the polygon mirror 35 into small spot sizes on a photosensitive member 55 across all scan positions.

However, in the example approach in FIG. 1, the beam expanding optic set 40 presents added complexity and cost to the scanning system 10. Moreover, the design requiring two additional lenses for expanding beam width before the light beam reaches the polygon mirror reduces robustness of the scanning system. This is because optical performance of a scanning system is generally very sensitive to alignment of the optics before the scanning mirror. By adding two additional optical components before the scanning mirror, additional accumulated tolerances are introduced on the optical path which makes it difficult to have precise optical alignment.

Accordingly, there is a need for an improved over-filled scanner type scanning unit which is more cost efficient.

SUMMARY

Example embodiments of the present disclosure provide a scanning system that utilizes a collimation lens for expanding beam width. According to an example embodiment, the scanning system includes a light source controllable to emit a light beam and a rotating scanning member having a plurality of reflective surfaces, the scanning member for receiving the light beam from the light source and deflecting at least portions of the light beam along a scan direction. The scanning system further includes a collimator lens disposed between the light source and the scanning member. The collimator lens is positioned at a distance less than a focal length thereof from the light source such that as the light beam from the light source passes through the collimator lens, the collimator lens diverges the light beam to be incident on at least two reflective surfaces of the scanning member.

The collimator lens may have a spherical light incident surface and an aspheric light exit surface. The light beam has a first width upon entering the collimator lens, and a second width that is at least twice greater than the first width at the scanning member. The collimator lens and the scanning member define therebetween an optical path of the light beam such that the optical path has only a prescan lens disposed therealong.

BRIEF DESCRIPTION OF THE DRAWINGS

The above-mentioned and other features and advantages of the disclosed embodiments, and the manner of attaining them, will become more apparent and will be better understood by reference to the following description of the disclosed embodiments in conjunction with the accompanying drawings, wherein.

DETAILED DESCRIPTION

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Spatially relative terms such as "top", "bottom", "front", "back" and "side", "above", "under", "below", "lower", "over", "upper", and the like, are used for ease of description to explain the positioning of one element relative to a second element. Terms such as "first", "second", and the like, are used to describe various elements, regions, sections, etc. and are not intended to be limiting. Further, the terms "a" and "an" herein do not denote a limitation of quantity, but rather denote the presence of at least one of the referenced item.

Furthermore, and as described in subsequent paragraphs, the specific configurations illustrated in the drawings are intended to exemplify embodiments of the disclosure and that other alternative configurations are possible.

Reference will now be made in detail to the example embodiments, as illustrated in the accompanying drawings. Whenever possible, the same reference numerals will be used throughout the drawings to refer to the same or like parts.

Figure 2:
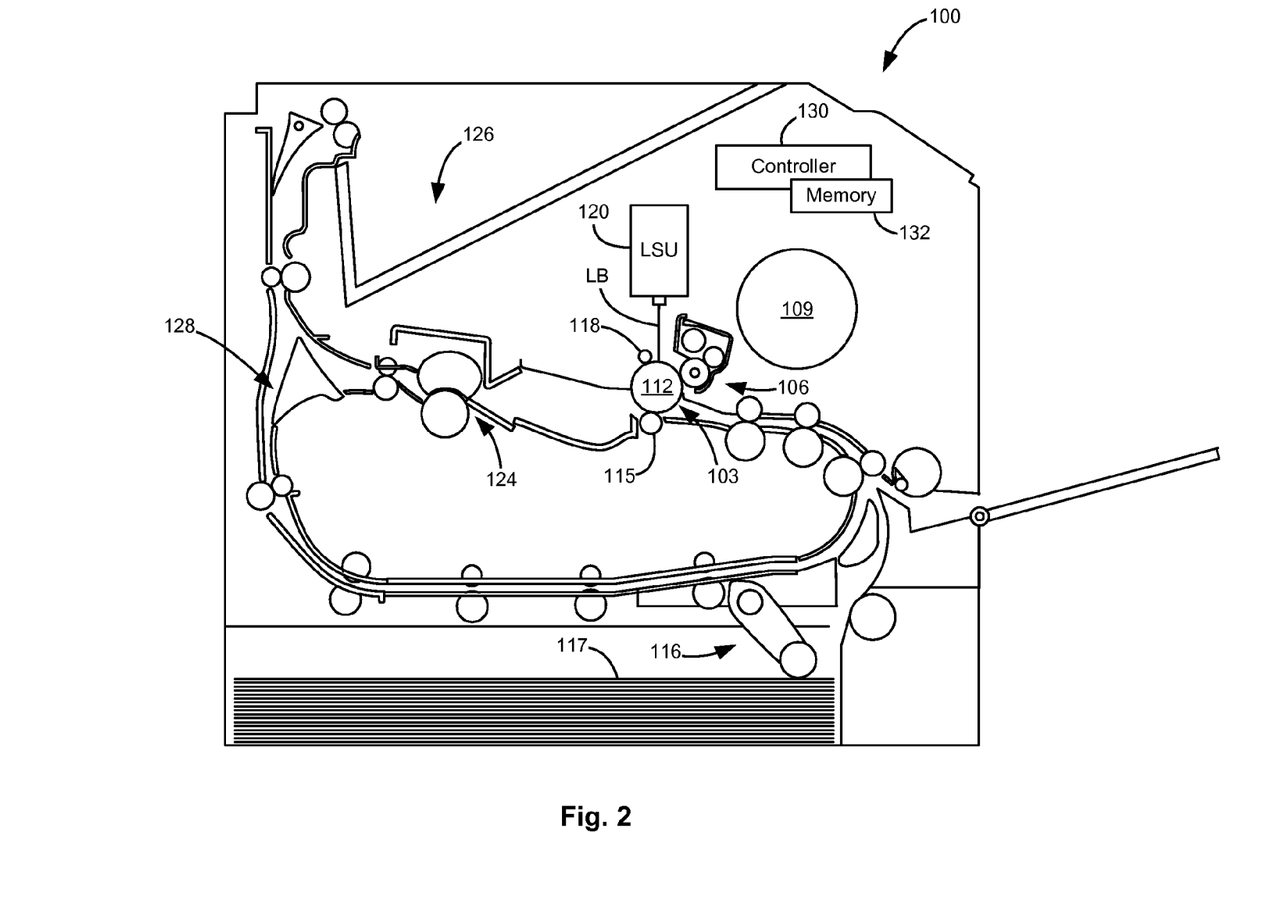
FIG. 2 is a side elevational view of an image forming apparatus according to an example embodiment.

FIG. 2 illustrates an image forming device 100 according to an example embodiment. Image forming device 100 may include a toner transfer area 103 having a developer unit 106 that is operably connected to a toner reservoir 109 for receiving toner for use in a printing operation. Toner reservoir 109 is controlled to supply toner as needed to developer unit 106. Developer unit 106 is associated with a photoconductive member 112 that receives toner therefrom during toner development to form a toned image thereon. Photoconductive member 112 is paired with a transfer member 115 for use in transferring toner to a sheet of print media that is picked by a pick assembly 116 from a media stack 117 and fed through toner transfer area 103 between photoconductive member 112 and transfer member 115.

During image formation, the surface of photoconductive member 112 is charged to a specified voltage, such as −800 volts, for example, by a charge roller 118. A laser beam LB from a laser scanning unit (LSU) 120 is directed to the surface of photoconductive member 112 and discharges those areas it contacts to form a latent image thereon. In one example embodiment, areas on the photoconductive member 112 illuminated and impinged by the laser beam LB are discharged to approximately −100 volts. The developer unit 106 then transfers toner to photoconductive member 112 to form a toner image thereon. The toner is attracted to the areas of the surface of photoconductive member 112 that are discharged by the laser beam LB from LSU 120. In one example embodiment, a positive voltage field formed in part by transfer member 115 attracts the toner image from photoconductive member 112 to the media sheet between the photoconductive member 112 and transfer member 115.

A fuser assembly 124 is disposed downstream of toner transfer area 103 and receives media sheets with the unfused toner images superposed thereon. In general terms, fuser assembly 124 applies heat and pressure to the media sheets in order to fuse toner thereto. After leaving fuser assembly 124, a media sheet is either deposited into output media area 126 or enters duplex media path 128 for transport to toner transfer area 103 for imaging on a second surface of the media sheet.

Image forming device 100 is depicted in FIG. 2 as a monochrome laser printer which utilizes only a single developer unit 106 and photoconductive member 112 for depositing black toner to media sheets. In other alternative embodiments, image forming device 100 may be a color laser printer having four photoconductive members, each corresponding to an associated one of cyan, yellow, magenta, and black image planes, and one or more LSUs for outputting light beams toward corresponding photoconductive members to form latent images on each photoconductive member. Toner may be transferred to a media sheet in a single step process—from the plurality of photoconductive members directly to a media sheet. Alternatively, toner may be transferred from each photoconductive member onto an intermediate transfer member in a first step, and from the intermediate transfer member to a media sheet in a second step. Further, image forming device 100 may be part of a multi-function product having, among other things, an image scanner for scanning printed sheets.

Image forming device 100 further includes a controller 130 and memory 132 communicatively coupled thereto. Though not shown in FIG. 1, controller 130 may be coupled to components and modules in image forming device 100 for controlling same. For instance, controller 130 may be coupled to toner reservoir 109, developer unit 106, photoconductive member 112, fuser assembly 124 and/or LSU 120 as well as to motors (not shown) for imparting motion thereto. It is understood that controller 130 may be implemented as any number of controllers and/or processors for suitably controlling image forming device 100 to perform, among other functions, printing operations.

Figure 3:
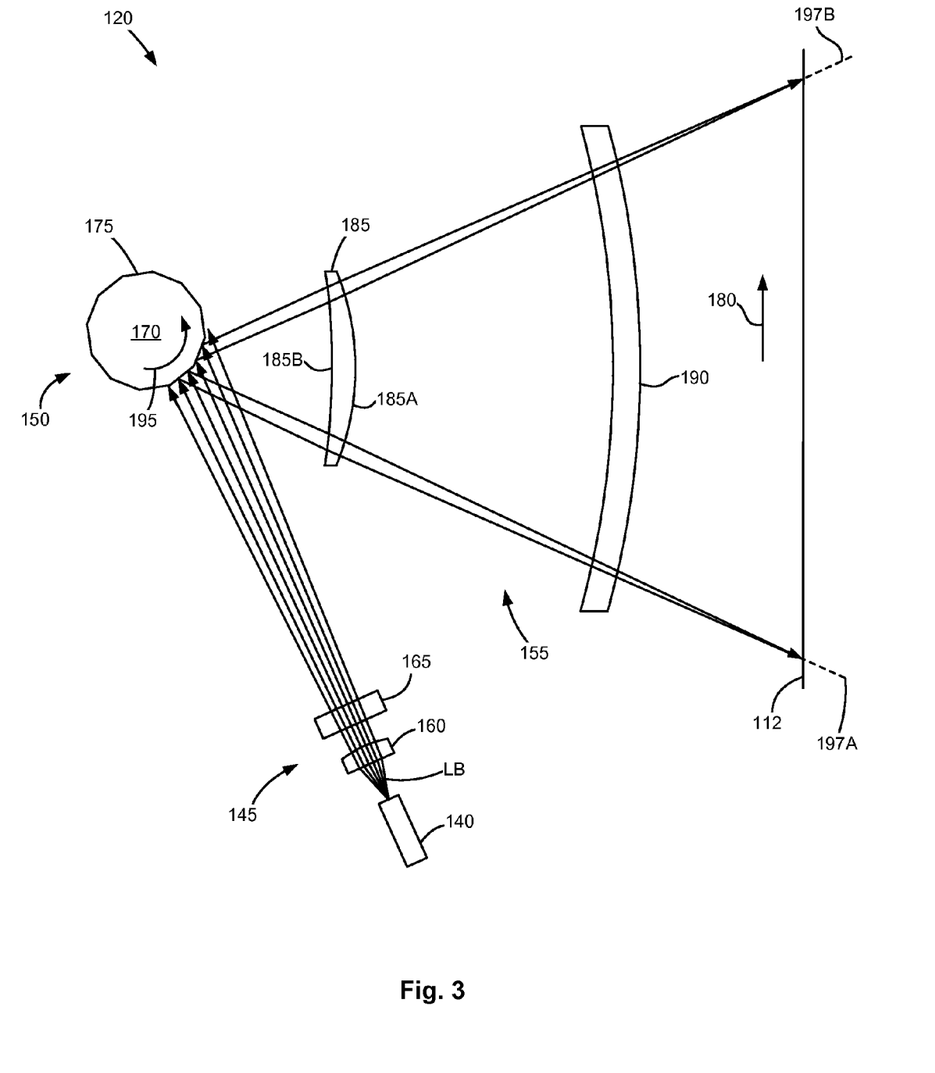
FIG. 3 illustrates an optical layout of a laser scanning unit of the imaging device in FIG. 1 according to an example embodiment.

Referring now to FIG. 3, a schematic layout of LSU 120 is shown according to an example embodiment of the present disclosure. LSU 120 may include a light source 140, pre-scan optics 145, a scanning device 150, and post-scan optics 155.

Light source 140 may emit a laser beam LB and may be implemented, for example, using a laser diode or any other suitable device for generating a beam of light. LSU 120 may also include driver circuitry (not shown) communicatively coupled to controller 130 for receiving video/image information and/or control data that may be utilized to set and/or vary the laser power used by light source 140. Pre-scan optics 145 may include a collimating lens 160 that receives laser beam LB emitted by light source 140, and a pre-scan lens 165 downstream collimating lens 160, relative to the beam path of laser beam LB, for minimizing pyramidal angle error of scanning device 150.

Scanning device 150 comprises a polygon mirror 170 having a plurality of reflective surfaces or facets 175 for receiving and reflecting light incident thereon. Generally, polygon mirror 170 is controllable by controller 130 using a motor (not shown) to rotate at a rotational velocity during an imaging operation so as to uni-directionally scan at least portions of laser beam LB to create scan lines on photoconductive member 112 in forward direction 180. Post-scan optics 155 may include scan lenses 185, 190 used to focus laser beam LB into small and uniform spot sizes on the surface of photoconductive member 112.

During an imaging operation, image data corresponding to an image to be printed may be converted by controller 130 into laser modulation data. The laser modulation data may be utilized by the driver circuitry to modulate light source 140 so that LSU 120 outputs modulated laser beam LB. According to example embodiments of the present disclosure, LSU 120 utilizes an over-filled polygon facet design. More particularly, laser beam LB is expanded so as to over-fill a facet 175 of polygon mirror 170 when performing a scan line operation. Thus, width of the incident light beam is larger than the length of a facet 175 of polygon mirror 170. In an example aspect, laser beam LB emitted by light source 140 is expanded so that it is wide enough to be incident on polygon mirror 170 to completely fill or cover at least two facets 175 of polygon mirror 170. When polygon mirror 170 rotates in the counter-clockwise direction 195, and as a facet 175 exposed to light beam LB rotates between a start and an end of a scan line operation (defined by scan positions 197A and 197B), the width of laser beam LB at polygon mirror 170 allows laser beam LB to cover an entire length of the facet from the start to the end of the scan line operation, thereby deflecting only a portion of the incoming light beam LB towards photoconductive member 112 during the entire scan line operation. Meanwhile, adjacent facet(s) or portions thereof exposed to light beam LB may direct other portions of laser beam LB away from photoconductive member 112. After the scan line operation, a subsequent scan line operation may be immediately performed by a subsequent facet in the same manner as the preceding facet. Thus, portions of light beam LB is always on the facet and there is substantially no inactive scan time corresponding to the time it takes for light beam LB to crossover an edge of a facet to a next facet for a subsequent scan line operation, thereby allowing for duty cycles (ratio of the active scan time on the photoconductive member to the total scan time of a facet) very close to 100%.

In accordance with example embodiments of the present disclosure, laser beam LB emitted by light source 140 may be intentionally diverged by collimation lens 160 so that laser beam LB overfills at least two facets 175 of polygon mirror 170. For example, in FIG. 3 with polygon mirror 170 having 12 facets, laser beam LB may have a first width, such as between about 4 mm to about 5 mm, upon entering collimation lens 160. As laser beam LB propagates from collimation lens 160 to polygon mirror 170, its width may be increased to a second width that is greater (or at least twice greater) than the first width, such as between about 8 mm and about 14 mm upon arriving at polygon mirror 170 so as to cover at least two facets.

Figure 4A:
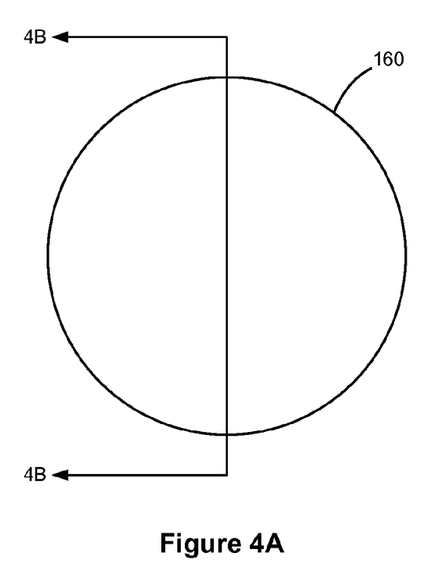
FIGS. 4A and 4B are front and side cross-sectional views, respectively, illustrating a profile of a collimation lens in FIG. 3, according to an example embodiment.
Figure 4B:
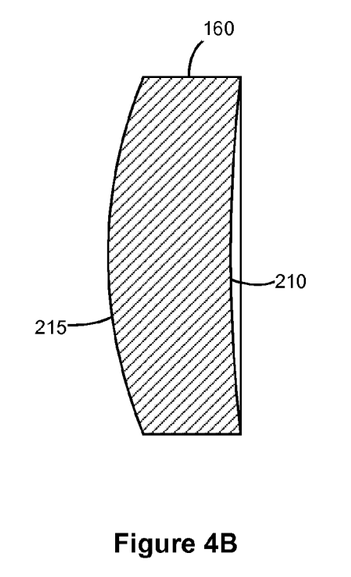

In an example embodiment, profile of collimation lens 160 may be adjusted so as to intentionally cause laser beam LB to diverge instead of being collimated after passing through collimation lens 160. FIGS. 4A-4B show an example shape and profile of collimation lens 160, in accordance with example embodiments of the present disclosure. FIG. 4A illustrates a front view of collimation lens 160 while FIG. 4B illustrates a side cross-sectional view thereof taken along lines 4B-4B of FIG. 4A.

As shown, collimation lens 160 may include a generally concave light incident surface 210 upon which laser beam LB is received from light source 140, and a generally convex light exit surface 215 upon which laser beam LB exits collimation lens 160. In an example embodiment, light incident surface 210 may be spherical while light exit surface 215 may be aspheric. The concave shape of the light incident surface 210 and the convex shape of the light exit surface 215 allows collimation lens 160 to intentionally diverge laser beam LB towards polygon mirror 170, instead of collimating laser beam LB.

Figure 5:
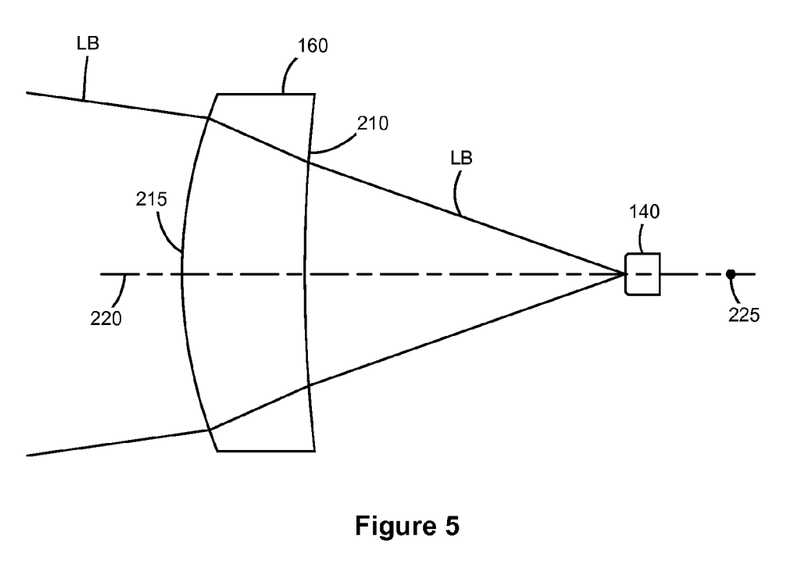
FIG. 5 is a schematic diagram illustrating relative positions of the collimating lens in FIG. 3 and a light source.

In another example embodiment, relative positions between collimation lens 160 and light source 140 may be adjusted such that the distance between them is less than a focal length of collimation lens 160. FIG. 5 illustrates an example arrangement between light source 140 and collimation lens 160. As shown, collimation lens 160 has an optical axis 220 and a focal point 225 therealong. Normally, positioning light source 140 at focal point 225 would cause laser beam LB emitted by light source 140 to collimate upon exiting collimation lens 160. However, in this example embodiment, light source 140 is arranged along optical axis 220 but offset from the focal point 225 of collimation lens 160 and, more particularly, between collimation lens 160 and its focal point 225. Thus, collimation lens 160 is positioned from light source 140 at a distance less than its focal length so that light beam LB would diverge instead of collimate after exiting light exit surface 215 of collimation lens 160.

Light incident surface 210 and light exit surface 215 may have surface equations that are derived or selected based on several factors to provide a desired focal length for collimation lens 160. As an example, light incident surface 210 may be defined by the surface equation:

$$z = \frac{r^2}{R\left(1 + \sqrt{1 - \frac{r^2}{R^2}}\right)};$$

while light exit surface 215 may be defined by the surface equation:

$$z = \frac{r^2}{R\left(1 + \sqrt{1 - (1+K)\frac{r^2}{R^2}}\right)} + A_4 r^4 + A_6 r^6 + A_8 r^8;$$

where z is the surface sag, R is the radius of curvature, r is the distance from the optical axis, K is the conic coefficient, and $A_4$, $A_6$, and $A_8$ are the aspheric coefficients. For a focal length of about 13.5 mm, R associated with light incident surface 210 may be about 120 mm. On the other hand, for light exit surface 215, the following values may be used: R=−8.3073, K=−0.3873, $A_4$=6.093×10$^{-5}$, $A_6$=6.438×10$^{-7}$ and $A_8$=3.703×10$^{-9}$. Further, in this example, distance from light source 140 to polygon mirror 170 may be between about 100 mm and about 250 mm, such as about 150 mm, and light source 140 may be positioned 1.50 mm from the focal point 225 in order to sufficiently grow laser beam LB from its first width at collimation lens 160 to its second width at polygon mirror 170. It will be appreciated, though, that the values presented herein are for purposes of illustration and thus should not be considered limiting. Accordingly, the coefficients, polynomial terms, and other values may be optimized to suit specific implementations.

Typically, since laser beam LB is diverging upon arriving at polygon mirror 170, portions of laser beam LB will also continue to diverge upon being deflected by a facet of polygon mirror 170. In order for the deflected portions of laser beam LB to converge and achieve a relatively small and substantially uniform spot size on the photoconductive member 112 for a given amount of laser power, scan lens 185 may be provided with a relatively large scan/optical power along the scan direction. For example, light exit surface 185A (FIG. 3) of scan lens 185 may be more curved than its light incident surface 185B so as to provide more focus and convergence of laser beam LB along the scan direction on the surface of photoconductive member 112. On the other hand, scan lens 190 may be provided with sufficient optical power along the sub-scan direction.

With the above example embodiments, LSU 120 utilizes collimation lens 160 as an effective beam expanding optical component, thus eliminating the need to incorporate the additional beam expanding optic set 40 in FIG. 1. Accordingly, use of only collimation lens 160 for expanding beam width may provide significant savings with respect to the overall cost of LSU 120, and consequently the cost of imaging apparatus 100. In addition, because of the simplicity of the optical layout requiring less optical components, such as requiring only collimation lens 160 and prescan lens 165 along the beam path of laser beam LB between light source 140 and polygon mirror 170, the above example design may reduce the tolerance stack up caused by accumulated variation of size and/or position of individual downstream optical components, and thus improve alignment robustness.

The description of the details of the example embodiments have been described in the context of electrophotographic imaging devices. However, it will be appreciated that the teachings and concepts provided herein are applicable to other systems employing optical scanners for scanning light beams.

The foregoing description of several methods and an embodiment of the invention have been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. A scanning system, comprising:
a light source controllable to emit a light beam;
a rotating scanning member having a plurality of reflective surfaces, the scanning member for receiving the light beam from the light source and deflecting at least portions of the light beam along a scan direction; and
a collimator lens disposed between the light source and the scanning member, the collimator lens positioned at a distance less than a focal length thereof from the light source such that as the light beam from the light source passes through and exits the collimator lens, the collimator lens diverges the light beam such that the light beam is incident on at least two reflective surfaces of the scanning member as a diverging light beam, wherein the collimator lens has a spherical light incident surface that is a concave surface and an aspheric light exit surface that is a convex surface.

2. The scanning system of claim 1, wherein the light beam has a first width upon entering the collimator lens, and a second width that is at least twice greater than the first width at the scanning member.

3. The scanning system of claim 1, wherein the collimator lens and the scanning member define therebetween an optical path of the light beam, the optical path having only a prescan lens disposed therealong.

4. The scanning system of claim 1, further comprising at least one scan lens disposed downstream from the scanning member relative to an optical path of the light beam, the at least one scan lens for focusing the at least portions of the light beam on an imaging surface.

5. The scanning system of claim 1, wherein a beam path length of the light beam from the light source to the scanning member is between about 100 mm to about 250 mm.

6. The scanning system of claim 1, wherein the scanning member comprises a polygon mirror.

7. The scanning system of claim 1, wherein the spherical light incident surface is defined by $$z1 = \frac{(r1)^2}{R1\left(1 + \sqrt{1 - \frac{(r1)^2}{(R1)^2}}\right)},$$

wherein where z1 is a surface sag of the spherical light incident surface, R1 is a radius of curvature of the spherical light incident surface, and r1 is a distance from an optical axis of the collimator lens, and wherein the aspheric light exit surface is defined by $$z2 = \frac{(r2)^2}{R2\left(1 + \sqrt{1 - (1+K)\frac{(r2)^2}{(R2)^2}}\right)} + A_4(r2)^4 + A_6^6(r2)^6 + A_8(r2)^8,$$

where z2 is a surface sag of the aspheric light exit surface, R2 is a radius of curvature of the aspheric light exit surface, r2 is a distance from an optical axis of the collimator lens, K is a conic coefficient, and $A_4$, $A_6$, and $A_8$ are the aspheric coefficients.

8. A scanning system for an imaging apparatus, comprising:
a light source controllable to emit a light beam;
a scanning mirror having a plurality of reflective surfaces, the scanning mirror receiving the light beam from the light source and deflecting at least portions of the light beam along a scan direction; and
a collimator lens disposed between the light source and the scanning mirror, the collimator lens having a light incident surface that is spherical and concave and a light exit surface that is aspheric and convex such that the collimator lens diverges the light beam upon exiting the collimator lens, the light beam being incident on at least two reflective surfaces of the scanning mirror as a diverging light beam.

9. The scanning system of claim 8, wherein the light source is positioned along an optical axis of the collimator lens and at a distance from the collimator lens that is less than a focal length thereof.

10. The scanning system of claim 8, wherein the light beam enters the light incident surface of the collimator lens at a first width, diverges upon exiting the light exit surface of the collimator lens, and arrives at the scanning mirror at a second width that is at least twice greater than the first width.

11. The scanning system of claim 10, wherein the first width of the light beam is between about 4 mm and about 5 mm, and the second width of the light beam is between about 8 mm and about 14 mm.

12. The scanning system of claim 8, wherein the collimator lens and the scanning mirror define therebetween an optical path of the light beam, the optical path having only a prescan lens disposed therealong.

13. The scanning system of claim 8, further comprising at least one scan lens disposed downstream from the scanning mirror relative to an optical path of the light beam, the at least one scan lens for focusing the at least portions of the light beam on an imaging surface.

14. The scanning system of claim 8, wherein the scanning mirror comprises a polygon mirror.

15. An imaging device, comprising:
a photoconductive member; and
a scanning unit generating a light beam and repeatedly scanning at least portions of the light beam across the photoconductive member to form scan lines thereon, the scanning unit including:
a light source for emitting the light beam;
a rotating scanning member having a plurality of reflective surfaces for receiving the light beam and deflecting at least portions thereof towards the photoconductive member; and
a collimator lens disposed between the light source and the scanning member, the collimator lens positioned at a distance less than a focal length thereof from the light source such that when the light beam from the light source passes through and exits the collimator lens, the collimator lens diverges the light beam such that the light beam, upon arriving at the scanning member, is a diverging light beam that has a width that is wider than a length of a reflective surface of the scanning member, wherein the collimator lens has a light incident surface that is spherical and concave and a light exit surface that is aspheric and is convex.

16. The imaging device of claim 15, wherein the width of the light beam at the scanning member is at least twice greater than a width of the light beam at a light incident surface of the collimator lens.

17. The imaging device of claim 16, wherein the width of the light beam at the light incident surface is between about 4 mm and about 5 mm, and the width of the light beam at the scanning member is between about 8 mm and about 14 mm.

18. The imaging device of claim 15, wherein the scanning unit further includes a prescan lens disposed along an optical path of the light beam defined between the collimator lens and the scanning member, the prescan lens being the only optical component along the optical path.

19. The imaging device of claim 15, wherein the scanning unit further includes at least one scan lens disposed between the scanning member and the photoconductive member, the at least one scan lens for focusing at least portions of the light beam deflected by the scanning member onto the photoconductive member.

20. The imaging device of claim 15, wherein the collimator lens diverges the light beam such that the diverging light beam is incident on at least two reflective surfaces of the rotating scanning member at one time.

* * * * *